(12) United States Patent
Demuynck et al.

(10) Patent No.: US 12,012,286 B2
(45) Date of Patent: Jun. 18, 2024

(54) CONVEYING SYSTEM COMPRISING FOLDING CARRIERS

(71) Applicant: MARELEC FOOD TECHNOLOGIES, Nieuwpoort (BE)

(72) Inventors: Lieven Demuynck, Gistel (BE); Piet Rommelaere, Koksijde (BE)

(73) Assignee: MARELEC FOOD TECHNOLOGIES, Nieuwpoort (BE)

( * ) Notice: Subject to any disclaimer, the term of this patent is extended or adjusted under 35 U.S.C. 154(b) by 0 days.

(21) Appl. No.: 18/011,825

(22) PCT Filed: Jun. 15, 2021

(86) PCT No.: PCT/IB2021/055243
§ 371 (c)(1),
(2) Date: Dec. 20, 2022

(87) PCT Pub. No.: WO2021/260489
PCT Pub. Date: Dec. 30, 2021

(65) Prior Publication Data
US 2023/0242346 A1  Aug. 3, 2023

(30) Foreign Application Priority Data
Jun. 25, 2020 (BE) .................................. 2020/5468

(51) Int. Cl.
*B65G 15/42* (2006.01)
*B65G 17/08* (2006.01)
*B65G 17/18* (2006.01)

(52) U.S. Cl.
CPC ............. *B65G 15/42* (2013.01); *B65G 17/08* (2013.01); *B65G 17/18* (2013.01)

(58) Field of Classification Search
CPC ........ B65G 15/42; B65G 17/08; B65G 17/18; B56G 15/44
(Continued)

(56) References Cited

U.S. PATENT DOCUMENTS 3,534,848 A * 10/1970 Marks .................... B65G 19/26
415/5
7,537,105 B2 * 5/2009 Fourney ............... B65G 47/841
198/732
(Continued)

FOREIGN PATENT DOCUMENTS

DE  8915286 U1  3/1990
EP  1064210 A1  1/2011

OTHER PUBLICATIONS

International Search Report and Written Opinion for PCT/IB2021/055243; mailing date of Sep. 23, 2021.

*Primary Examiner* — Mark A Deuble
(74) *Attorney, Agent, or Firm* — FRESH IP PLC; Clifford D. Hyra; Aubrey Y. Chen (57) ABSTRACT

The present disclosure relates to a conveying system for conveying goods, the conveying system including a conveying belt, which includes conveying modules and pins, that: (1) is drivable about turning wheels along a closed path, (2) is provided with receiving cavities, in which the conveying belt is free from conveying modules and from pins along a length greater than the intermediate distance (t) between the pins, and (3) is designed to be continuous adjacent to the lateral sides of the receiving cavities. The conveying system further includes carriers, where each carrier: (1) is hingeably attached to a pin, on a front side of a receiving cavity, between a folded-down position and a folded-up position, (2) has a height greater than a said intermediate distance (t), and (3) extends entirely within the path of the conveying belt in the receiving cavity, between said turning wheels (7), at a discharge point (X) and in the folded-down position.

12 Claims, 8 Drawing Sheets

(58) Field of Classification Search
USPC .......................................... 198/697, 850–853
See application file for complete search history.

(56) References Cited

U.S. PATENT DOCUMENTS

| | | | | |
|---|---|---|---|---|
| 8,109,384 B2* | 2/2012 | Pressler | ............. | B65G 47/8823 |
| | | | | 198/459.7 |
| 8,544,634 B2* | 10/2013 | Fourney | ................ | B65G 47/29 |
| | | | | 198/459.7 |
| 8,701,871 B2* | 4/2014 | Fourney | ................ | B65G 17/24 |
| | | | | 198/779 |
| 8,944,236 B2* | 2/2015 | Fourney | ............. | B65G 47/8823 |
| | | | | 198/779 |
| 8,985,311 B2* | 3/2015 | Stockholm Johansson | ................ | |
| | | | | B65G 17/18 |
| | | | | 198/732 |
| 9,701,479 B2* | 7/2017 | Westergaard Andersen | ................ | |
| | | | | B65G 17/08 |
| 11,117,748 B1* | 9/2021 | De Graw | ............... | B65G 17/16 |

\* cited by examiner

CONVEYING SYSTEM COMPRISING FOLDING CARRIERS

This application is a National Phase entry of International Application No. PCT/IB2021/055243 under § 371 and claims the benefit of Belgian Patent Application No. BE-2020/5468, filed Jun. 25, 2020, which is hereby incorporated by reference in its entirety.

FIELD OF THE DISCLOSURE

The present disclosure relates to a conveying system for conveying goods along a conveying direction to a discharge point, comprising:
- a conveying belt, comprising conveying modules and pins which extend transversely to the conveying direction, wherein the pins are arranged an intermediate distance apart in order to couple the conveying modules together so as to form the conveying belt;
- turning wheels, around which the conveying belt is drivable along a closed path;
- receiving cavities, in which the conveying belt is free from said conveying modules; and
- carriers, wherein each carrier is hingeably attached to a said pin, which is arranged on a front side of a said receiving cavity, between a folded-down position, in which this carrier is accommodated in this corresponding receiving cavity, and a folded-up position, in which this carrier is upright with respect to the conveying belt in order to entrain the goods when conveying these goods.

More specifically, but not limiting, the present disclosure relates to such a conveying system for the food-processing industry, for conveying foodstuffs, such as for example fish or chicken. Such foodstuffs are typically tacky, sticky products.

BACKGROUND

Conveying systems are used to displace goods in various applications in the food-processing industry. By way of non-limiting example, weighing and/or sorting installations may be mentioned which typically require a supply of separate goods in order to be able to function. In this case, products are typically taken to the desired height and are then brought up to speed via conveying belts in order to weigh these products and/or sort them according to certain criteria.

A minimum distance between the goods is necessary in order to make individual weighing possible. Furthermore, a sorting installation also requires a minimum intermediate distance. In order to make a weighing and/or sorting installation work as efficiently as possible, a supply installation (conveying system) is consequently required. This supply installation takes the goods one by one to the weighing and sorting installation.

The positioning accuracy with which the goods are delivered to, for example, a weighing and/or sorting installation determines the capacity of the installation. If the difference in intermediate distance is considerable, the supply velocity will have to be lowered until the weighing and/or sorting installation is able to process all products. This may cause a great difference between the effective capacity and the maximum achievable capacity of the installation.

There are various designs to supply products separated to, for example, a sorting installation. The present disclosure relates to applications wherein conveying belts are provided with so-called carriers. These carriers are able to convey the separated product upwards without loss of separation. These carriers may also be used with horizontal conveying systems, in which case they only ensure that separated products do not touch each other. When the product is carried away to a subsequent device (typically having a subsequent conveying belt), a falling movement typically occurs, as a result of which the product drops in height and loses positioning accuracy. After all, it is not always possible to predict how the product will be entrained by the subsequent conveying belt after this falling movement.

In particular, the carrier has as many drawbacks as advantages. The ideal conveying belt (optionally horizontal or ascending) only has carriers where they are required.

With a conveying system to which the present disclosure relates, the carriers are therefore provided in a conveying path for conveying the goods, but these carriers typically disappear before the product is discharged to a subsequent device. The carriers disappear before the discharge point in order to limit the drop height. The conveying belt then does not have any carriers at the location of the discharge point. This limits the drop in height and the product can be transferred without any significant falling movement.

As regards the intended food sector, the height of the carriers is always limited in order to allow the conveying belt to travel through a bend at the location of the discharge point without the folded-down carriers hitting a subsequent device in which the goods are carried away. As a result thereof, the goods which can be transported by means of such a conveying system are typically limited in size and in weight.

Existing solutions from other sectors cannot be readily applied to the food sector.

GB 2 515 775 A describes a conveying system comprising folding carriers in which the folding carriers on top of the conveying belt fold down but part of them continues to protrude with respect to the conveying belt in the bend at the location of the supply point. The height of this carrier should be chosen as a compromise to the intermediate distance which this protruding carrier requires with respect to the device to which the goods are discharged.

EP 1 826 159 A1 describes a conveying system in which the modules of the modular conveying belt (linked belt) are raised to form carriers. In order to do this, the belt has to be of sufficient length. As the conveying belt itself is raised locally, the height of the carrier which can be achieved thereby is thus limited to approximately one module of the conveying belt. Otherwise, a belt which is made too long causes several problems.

DE 89 15 286 Ul describes a conveying system comprising folding carriers, in which each carrier occupies the space of a module of the modular conveying belt. WO 2014/111091 A1 describes a variant of such a conveying system, in which modules of the modular conveying belt are configured as carriers. In this way, the height of the carriers of such a conveying system is limited to the dimensions of such a module.

SUMMARY

It is the object of the present disclosure to provide a conveying system which can be used for several products and more specifically foodstuffs, such as for example fish or chicken.

This object of the disclosure is achieved by providing a conveying system for conveying goods along a conveying direction to a discharge point, comprising:

a conveying belt, comprising conveying modules and pins which extend transversely to the conveying direction, wherein the pins are arranged an intermediate distance apart in order to couple the conveying modules together so as to form the conveying belt;

turning wheels, around which the conveying belt is drivable along a closed path;

receiving cavities, in which the conveying belt, viewed in the conveying direction, is free from conveying modules and free from pins along a length greater than a said intermediate distance and wherein the conveying belt is designed to be continuous adjacent to the lateral sides of the receiving cavities; and carriers, wherein each carrier:
- is hingeably attached to a said pin, which is arranged on a front side of a said receiving cavity, between a folded-down position, in which this carrier is accommodated in this corresponding receiving cavity, and a folded-up position, in which this carrier is upright with respect to the conveying belt in order to entrain the goods when conveying these goods;
- has a height greater than a said intermediate distance; and
- extends entirely within the closed path of the conveying belt, between said turning wheels, at the location of the discharge point and in the folded-down position.

According to embodiments of the disclosure, each receiving cavity is provided with a length greater than a said intermediate distance, viewed in the conveying direction.

Because this receiving cavity is free from conveying modules and pins, it is possible to accommodate a carrier in the folded-down position therein. As the receiving cavity is longer than said intermediate distance, this carrier may have a height greater than this intermediate distance. In addition, due to the fact that, in the folded-down position, this carrier can extend entirely within the closed path of the conveying belt, due to folding down these carriers at the location of the discharge point between the turning wheels at this discharge point, it is possible to ensure that the carrier will not protrude with respect to this conveying belt when the conveying belt follows a bend around these turning wheels. As a result thereof, it is possible to position a further device on which the goods are discharged downstream of this conveying belt to be closely adjacent to this conveying belt, and thus to limit the drop height of these goods. Despite the fact that the receiving cavity is free from conveying modules and pins, the conveying belt can still freely follow a bend around the turning wheels, as the conveying belt adjoining the lateral sides of the receiving cavity is designed to be continuous. On each lateral side of the receiving cavity, the corresponding continuous part of the conveying belt can be passed along the closed path over the corresponding turning wheel.

According to embodiments the disclosure, the carrier can thus be designed to be higher than is the case with the prior art, as a result of which a larger variety of goods can be conveyed by means of such a conveying device.

In order to make the conveying belt adjacent to the lateral sides continuous, part modules and part pins may be provided here which are shorter than the conveying modules and pins in the other part of the conveying belt. Alternatively, it is for example possible to provide a portion of a belt or chain for this purpose, in order to complete the conveying belt between the conveying modules and pins.

It is possible to provide a corresponding receiving cavity for each carrier. In the case of different conveying belts of different widths, carriers of different corresponding widths may be configured for this purpose. In this case, these carriers may be adapted to cover as large a width as possible of these conveying belts.

However, it is also possible to arrange several carriers next to each other in one receiving cavity. In this way, it is for example also possible to provide a relatively small standard-sized carrier, in which case it is possible to combine several such carriers in order to form a composite carrier. Thus, conveying belts of different widths may be constructed using the same carriers, in which case the composite carriers together cover as large a width as possible of these conveying belts.

In order to drive the pivoting movement of the carriers, each carrier of a conveying system according to embodiments of the present disclosure preferably comprises a guide element. In this case, the conveying system furthermore preferably comprises a guide system for guiding the guide element in order to drive the pivoting movement of the carrier in such a way that, when driving the conveying belt along the closed path, in a conveying path of the closed path, the carrier remains in its folded-up position in order to convey the goods and the carrier is moved to its folded-down position at the location of the discharge point.

Such a guide element may be designed to be a single piece with the rest of the carrier or may be designed as a separate element with which the carrier is provided.

In a preferred embodiment, each carrier comprises a support element to support the carrier in the conveying path by means of the guide system on a support side of the corresponding receiving cavity opposite the front side of the receiving cavity.

By means of such a support element, such a carrier is able to transmit larger forces. In this way, it is not only possible to convey larger goods, but it is also possible to convey much heavier goods. As a result thereof, an even wider variety of goods can be conveyed. Thus, it is for example also possible to convey entire chickens by means of such a conveying belt.

As is the case with the prior art, the turning wheels, between which each carrier extends in the folded-down position at the location of the discharge point, will be arranged so as to be rotatable about an axle. In a preferred embodiment, this axle forms part of the guide system. In this case, the axle is provided in order thereby to guide the guide element at the location of the discharge point, when the carrier extends between these turning wheels. To this end, it is possible to guide the guide element directly about this axle in order to be able to use the space between the turning wheels in an optimum manner so that the carrier can extend in between, without these turning wheels having to be made excessively large to this end.

Alternatively, it is for example also possible to provide the axle with a guide wheel over which the guide element is guided.

Each carrier will comprise a front wall which is provided in order to be upright in the folded-up position of the carrier with respect to the conveying belt on the front side of the receiving cavity. In this case, in the folded-up position of the carrier, this front wall then preferably extends at an angle of between 45° and 90° with respect to the conveying belt and still more preferably at an angle of approximately 90°.

In a simple embodiment, the carriers may be of substantially plate-shaped design. In the simplest embodiment, this carrier will leave the receiving cavity substantially free in the folded-up position. In order to prevent goods from falling into this receiving cavity, for example carrying straps may be provided below the conveying belt which cover this receiving cavity.

Preferably, a carrier will also comprise one or more additional covering walls in addition to the front wall in order to cover the corresponding receiving cavity in the folded-up position of the carrier.

By means of such covering walls, it is not only possible to prevent goods from falling into the receiving cavity, but also to prevent these goods from becoming stuck in the receiving cavity. When goods get stuck in the receiving cavity, they may prevent the folding down of a carrier at the location of the discharge point.

With a considerable number of goods, it is possible to prevent these goods from rolling to the front side of the carrier and from being entrained by this carrier during conveying by means of an inclined conveying belt. With such goods, the risk of these goods falling into this receiving cavity or getting stuck can be limited by a considered positioning of the receiving cavities and a considered choice for loading the goods onto the conveying belt. This risk is reduced further by means of the covering walls. However, there are also goods, typically more angular goods, such as for example chicken wings, which do not roll so easily. Such goods are at a greater risk of falling into the receiving cavity or getting stuck. By means of said covering walls, it is also possible to ensure that such goods do not fall into the receiving cavity or get stuck. Such covering walls also help to ensure that goods remain separated, even when these goods are being carried away to a further device.

A carrier with such a front wall and one or more covering walls is preferably of a hollow design in order to make it as lightweight as possible. However, it is also possible to make such a carrier solid.

More specifically, each carrier may comprise side walls as covering walls on both its lateral sides. With such an embodiment, at least one of these side is then preferably designed as a said guide element. This side wall then has a double function, on the one hand for covering the receiving cavity and on the other hand for driving the pivoting movement of the carrier. Still more preferably, both side walls are designed as such a guide element.

In a particularly preferred embodiment, each side wall which is designed as a guide element is provided with a recess along its bottom edge for accommodating the axle which forms part of the guide system.

More specifically, the side wall may be designed to be hook-shaped between the support element and the recess in order to hook the side wall over the axle.

When the pivoting movement of the carrier is guided over the axle between the turning wheels at the location of the discharge point, then a conveying system according to embodiments of the disclosure preferably also comprises a release element which is disposed at the location of the axle to engage with each carrier in order to release the carrier from the axle in order to ensure that the carrier does not get stuck to the axle in an undesirable manner which would prevent the conveying belt from being driven further.

On its side opposite said front wall, a carrier preferably also comprises a rear wall as covering wall. In this case, this rear wall is preferably of a concave design. By making it concave, this rear wall may, in the folded-up position of the carrier, adjoin the corresponding edge of the receiving cavity, without this rear wall becoming stuck to this edge during the pivoting movement of the carrier. By means of such a rear wall, it is therefore possible to cover the receiving cavity to the maximum degree.

If such a carrier is also provided with a said support element, then this support element preferably forms a projection at the bottom of the rear wall.

In this case, this support element then preferably extends at the bottom of this rear wall along the entire edge.

In addition to a front wall and a rear wall, each carrier preferably also comprises a top wall as a covering wall which connects the front wall and the rear wall.

In this way, it is ensured that the goods remain separated to the greatest possible extent, since these are separated from each other by the carriers to the greatest possible extent.

More specifically, this top wall may extend virtually parallel to the conveying belt in the folded-up position of the carrier.

BRIEF DESCRIPTION OF THE DRAWINGS

The present invention will now be explained in more detail by means of the following description of a conveying belt according to the present invention. The sole aim of this description is to give illustrative examples and to indicate further advantages and features of the present invention, and can therefore by no means be interpreted as a limitation of the area of application of the invention or of the patent rights defined in the claims.

Reference numerals are used in this detailed description to refer to the attached drawings, in which.

DETAILED DESCRIPTION

The illustrated conveying systems (1) are configured for conveying foodstuffs, such as fish or chicken, to a discharge point (X) along a conveying direction (A). In the figures, these conveying systems (1) are configured to transport these goods upwards to a further device (not shown), which is arranged at the location of the discharge point (X) and adjoining the illustrated conveying systems (1). Alternatively, it is also possible to provide conveying systems (1) in which the goods are moved substantially horizontally. To this end, the illustrated conveying systems (1) can easily be modified in a known manner.

The conveying systems (1) in each case comprise a conveying belt (2) which is configured as a linked belt and is to this end provided with conveying modules (3) which are coupled together by means of pins (4) to form the conveying belt (2). In this case, the pins (4) are, viewed transversely to the conveying direction (A), arranged at an intermediate distance (t) apart. Constructing a conveying belt (2) by means of such conveying modules (3) and pins (4) is well-known. In order to keep the figures simple, these conveying modules (3) and pins (4) have only been shown in FIGS. 9 and 10.

The endless conveying belt (2) is in each case drivable about turning wheels (7, 8) along a closed path. Further guide wheels (25) concomitantly determine this closed path. In the illustrated embodiments, the top turning wheels (7) are in each case fitted so as to be rotatable about a driven axle (9). The bottom turning wheels (8) are arranged so as to be freely rotatable about an axle. Alternatively, it is also possible, conversely, to drive the bottom turning wheels and to arrange the top turning wheels so as to be freely rotatably. The guide wheels (25) are arranged so as to be freely rotatable about an axle.

Figure 9:
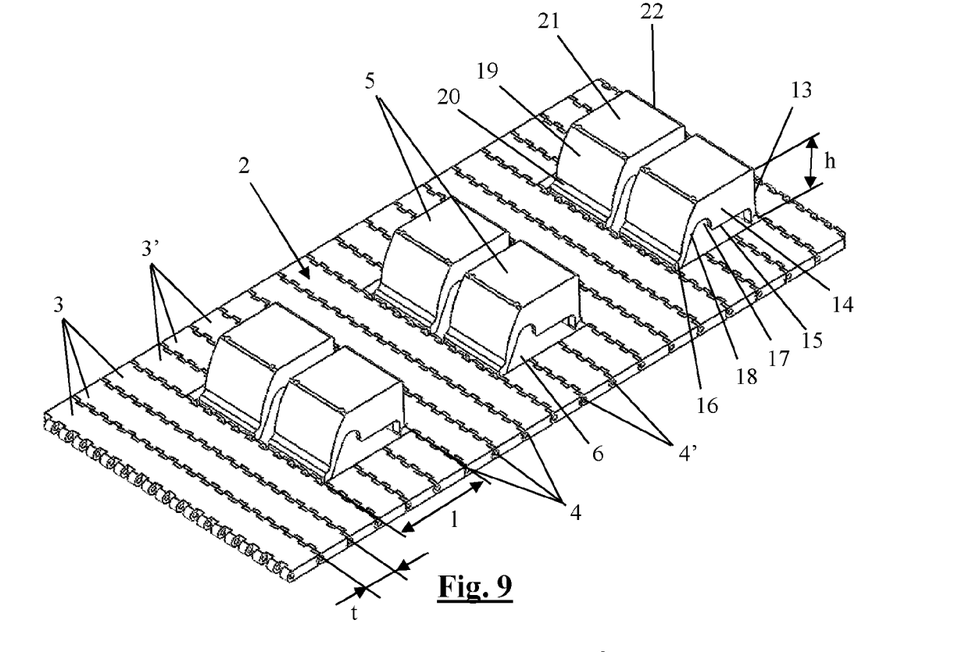
FIG. 9 separately shows a part of the conveying belt of the conveying system from FIG. 2 in perspective, at the location of a few carriers.

The conveying systems (1) are in each case provided with receiving cavities (6) at a regular intermediate distance apart, in which the conveying belt (2) is free from conveying modules (3) and from pins (4) over the length (l) of more than one said intermediate distance (t). On the lateral sides of these receiving cavities (6), the conveying belt (2) is designed to be continuous, for example by means of part modules (3') and part pins (4'), as is illustrated in FIG. 9. Alternatively, it is for example possible to provide a portion of a belt or chain for this purpose, in order to complete the conveying belt (2) between the conveying modules (3) and pins (4).

On the front side of the receiving cavities (6), a carrier (5) is in each case hingeably attached to a pin (4) which is arranged adjacent to this receiving cavity (6).

The carriers (5) in each case have a height (h) greater than a said intermediate distance (t).

Each carrier (5) is at least hingeable between a folded-down position, in which this carrier (5) is accommodated in the receiving cavity (6), and a folded-up position, in which this carrier (5) is upright with respect to the conveying belt (2) in order to entrain the goods when conveying these goods.

In the figures, the carriers (5) which are arranged on the top side of the conveying belt (2) are in each case in the folded-up position and the carriers (5) which are arranged at the location of the discharge point (X) are in each case in the folded-down position. At the location of the discharge point (X) and in the folded-down position, the carriers (5) in each case extend entirely within the closed path of the conveying belt (2), between the top turning wheels (7), as can be seen in FIGS. 1-2, 4, 6, 8 and 25.

In the illustrated embodiments, these carriers (5) are in each case also hingeable beyond these said positions. The carriers (5) which, in the figures, hang from the underside of the conveying belt (2), hang down on account of the force of gravity and they may in this case be tilted beyond the folded-up position. In principle, these carriers (5) may also be tilted in the opposite direction to beyond the folded-down position. During normal operation of the illustrated conveying system (1), these will however not tilt beyond this folded-down position, as will also be explained below.

In order to drive the pivoting movement of the carriers (5), the illustrated conveying systems comprise a guide system (9, 10) for guiding a guide element (14) of the carrier (5). The drive of this pivoting movement can be seen most clearly in FIGS. 1 and 2.

The guide system (9, 10) in each case comprises guide rails (10) which are arranged within the closed path under the top part of the conveying belt (2).

The carriers (5) hang freely downwards below the conveying belt (2) on account of their weight, and are tilted beyond the folded-up position. When driving the conveying belt (2) along the closed path, the carriers (5) tilt to their folded-up position when the conveying belt (2) is passed around the bottom turning wheels (8).

When the carriers (5) are then situated on the top side of the conveying belt (2), guide rails and/or guide strips (10) keep the carriers (5) in their folded-up position due to the fact that their guide element (14) is passed on top of these guide rails and/or guide strips (10). At the end of the guide rails and/or guide strips (10), a downward piece (11) is provided which ensures that the carriers (5) start to tilt to their folded-down position. Downstream of this downward piece (11), the carriers (5) will tilt further between the top turning wheels (7) on account of their weight toward their folded-down position, in which case these carriers (5) extend entirely within the closed path of the conveying belt (2) at the location of the discharge point (X).

Figure 1:
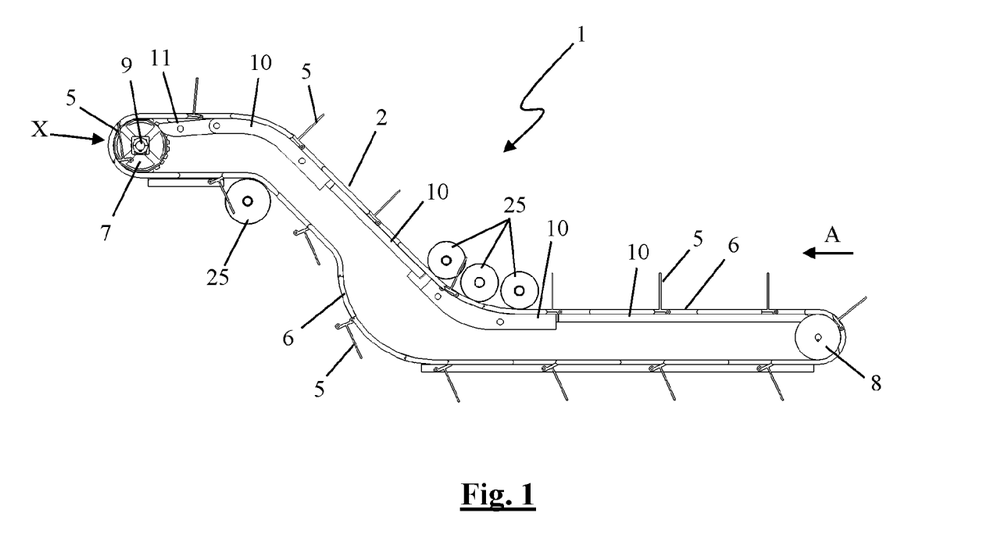
FIG. 1 diagrammatically shows a first embodiment of a conveying system according to embodiments of the present disclosure in longitudinal section.

In the first illustrated embodiment, the carriers (5) are of the simplest design. These are existing carriers (5) which are normally fixedly arranged in conveying systems without being able to fold down. This first embodiment of a conveying system (1) can therefore be carried out in a relatively simple and inexpensive manner. In existing conveying systems, these carriers (5) are fixed with two pins. Now, these carriers (5) are only fitted using one of the two pins (5) provided at the front of a flange (14) which is provided below the carrier (5) and which also serves as said guide element.

Each of these carriers (5) is thus pulled forward at the front. At the back, these carriers (5) are arranged so as to be free. As a result thereof, this carrier (5) can now hinge downwards at the locations where no carrier (5) is required in the conveying system (1). As a result thereof, this carrier (5) cannot transmit any pulling power at this location in the conveying belt (2). Typically, a piece of continuous belt or chain will be provided next to or between these carriers (5) which can absorb the pulling power. If a few modules are omitted behind this carrier (5) to form the receiving cavity (6), there is space to allow this high carrier (5) to fold down into the conveying belt (2).

At the locations where the flange (14) is guided below the carrier (5), this will typically be effected by means of sufficiently wide carrying straps (26) which serve as guide strips (10). These carrying straps (26) additionally ensure that the receiving cavity (6) is completely covered downstream of the carrier (5), where the conveying belt (2) is interrupted. In this way, product is prevented from dropping through the conveying belt (2).

Figure 2:
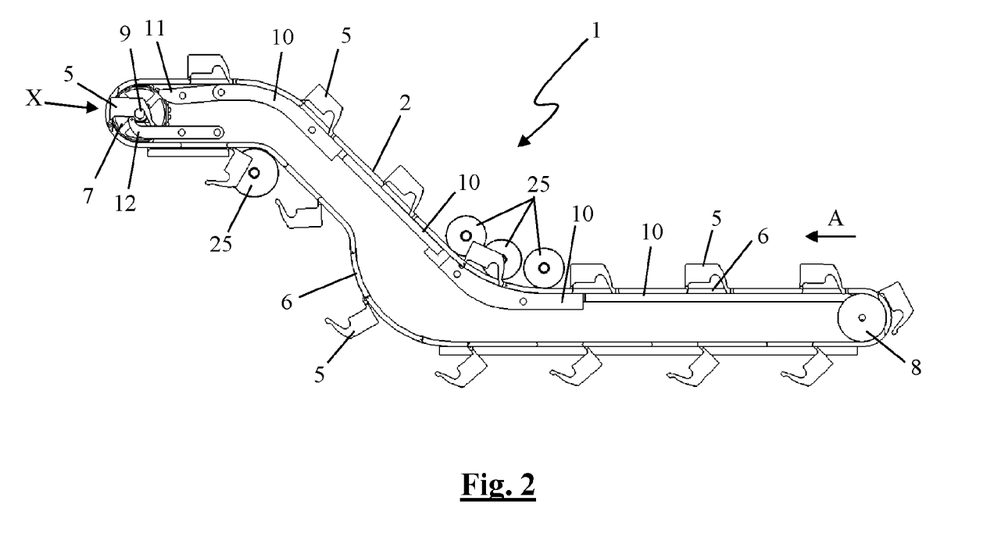
FIG. 2 diagrammatically shows a second embodiment of a conveying system according to embodiments of the present disclosure in longitudinal section.
Figure 3:
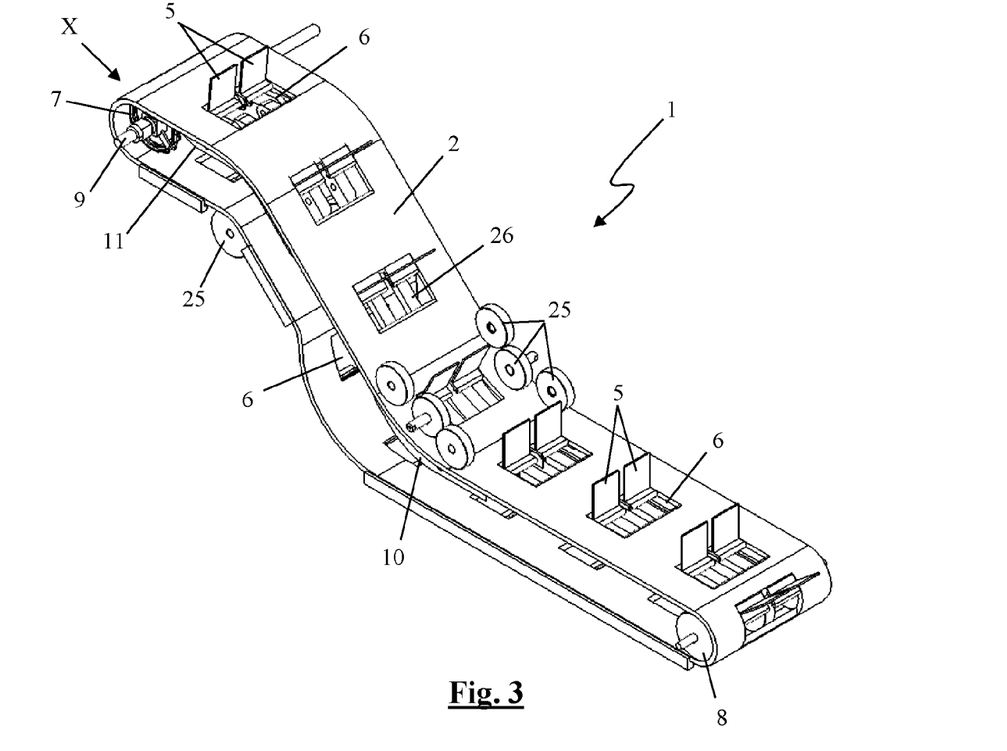
FIG. 3 diagrammatically shows the conveying system from FIG. 1 in perspective, viewed from a supply side.
Figure 4:
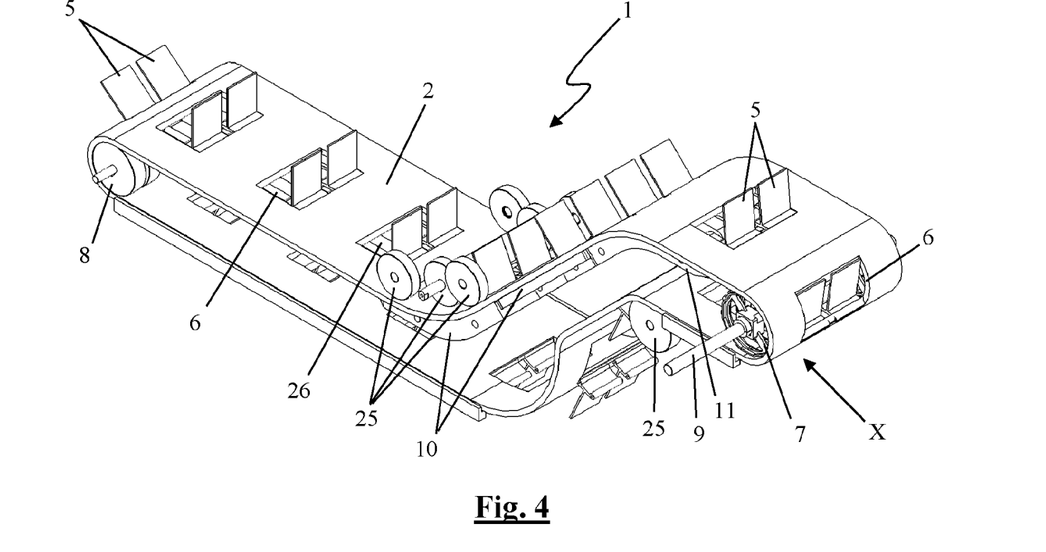
FIG. 4 diagrammatically shows the conveying system from FIG. 1 in perspective, viewed from a discharge side.
Figure 5:
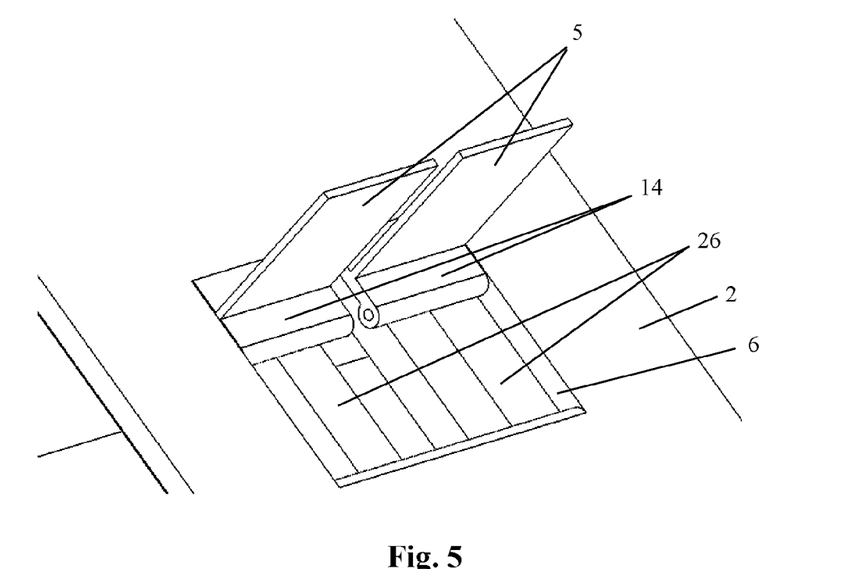
FIG. 5 diagrammatically shows a part of the conveying system from FIG. 1 in perspective at the location of a few carriers.
Figure 6:
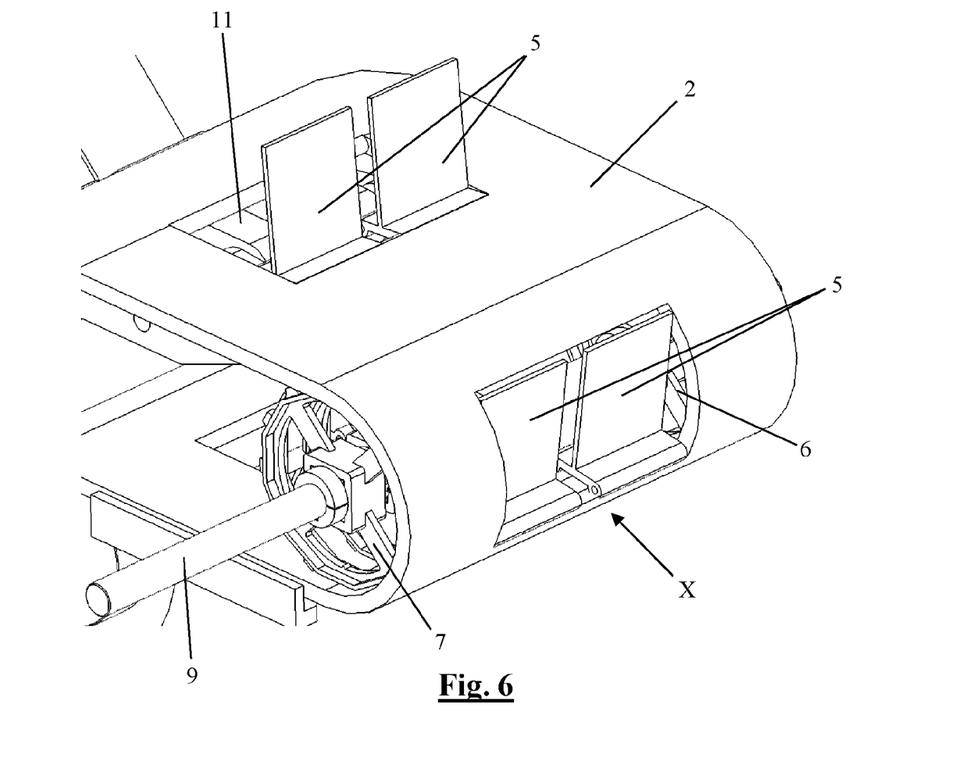
FIG. 6 diagrammatically shows a part of the conveying system from FIG. 1 in perspective at the location of the discharge point.
Figure 7:
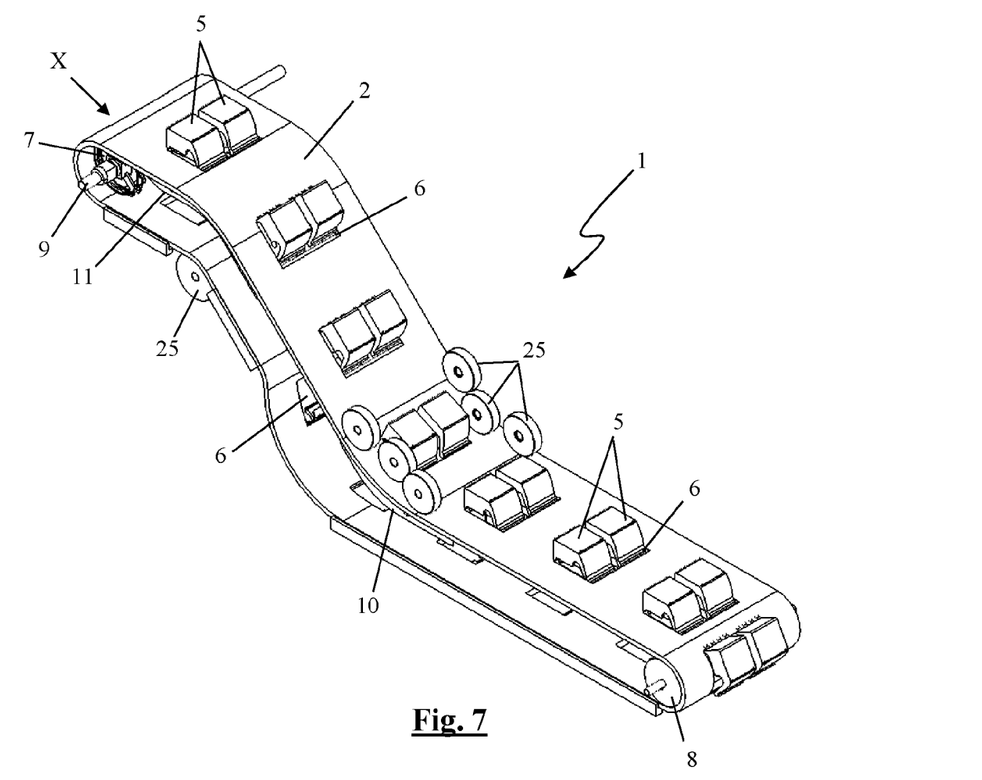
FIG. 7 diagrammatically shows the conveying system from FIG. 2 in perspective, viewed from a supply side.
Figure 8:
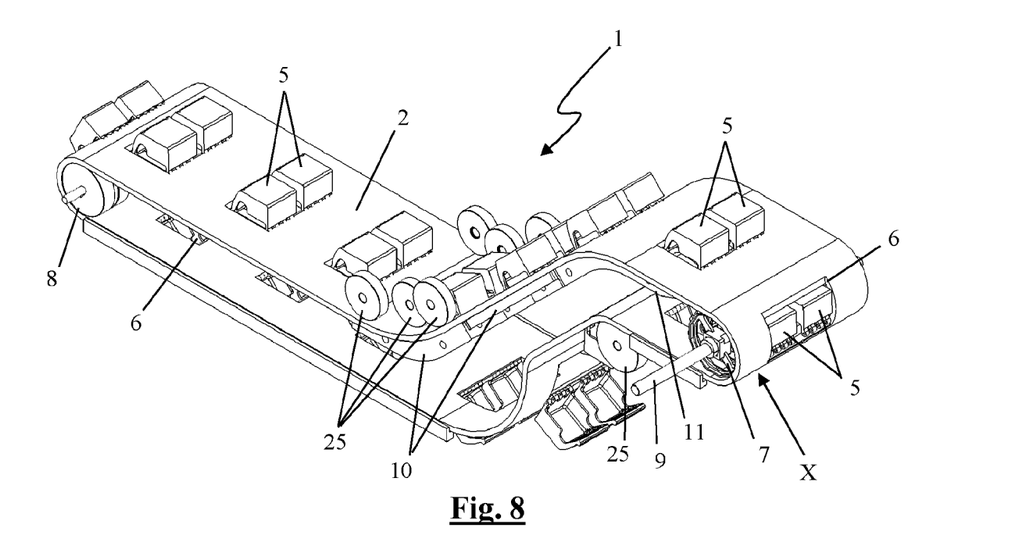
FIG. 8 diagrammatically shows the conveying system from FIG. 2 in perspective, viewed from a discharge side.

In the second illustrated embodiment, the carrier (5) is made longer than said intermediate distance (t). This carrier (5) has a height which is necessary in order to convey the product in the desired manner or to raise it.

The carrier (5) has a front wall (13) which is provided in order to be upright in the folded-up position with respect to the conveying belt (2) on the front side of the receiving cavity (6), side walls (14) on its two lateral sides, a rear wall (19) and a top wall (21). The side walls (14), rear wall (19) and top wall (21) serve as covering walls (14, 19, 21).

The shape of the carrier (5) with several covering walls (14, 19, 21) prevents an opening in the conveying belt (2) being created downstream of the carrier (5). This carrier (5) is therefore sufficiently long to cover the receiving cavity (6), which is necessary for folding-in, in the folded-up position. As an additional advantage, the space where product can be deposited is limited to a specific zone behind the carrier (5), as a result of which this conveying system may also be used without an inclined part in the conveying belt (2) being provided. In the illustrated embodiment, a space having a length which is three times the intermediate distance (t) is in each case provided downstream of the carrier (5) for depositing a product. The length of the carrier (5) is in this case (not obligatory) the equivalent of 3 intermediate distances (t). In this example, there is therefore a guaranteed space of 3 intermediate distances (t) between the products. Consequently, no incline is required to make the product roll onto the carrier (5). As a result thereof, the system is also efficient with products which do not typically roll down an incline (for example angular objects, such as chicken wings).

In order to be able to convey large weights, the carrier (5) is provided with a support element (16) in order to support the carrier (5) in the conveying path on a support side of the receiving cavity (6) opposite the front side of the receiving cavity (6) by means of the guide rails and/or guide strips (10).

In order to make the carrier (5) fold down at the location of the discharge point (X) to a subsequent conveying belt, the geometry is specifically adapted to the diameter of the driven turning wheels (7).

The side walls (14) of the carrier (5) are designed as guide element (14). The turning wheels (7) are arranged so as to be rotatable about the drive axle (9). This drive axle (9) forms part of the guide system (9, 10). The rear side of the carrier (5) drops to behind the axle (9) of the drive in order to be able to fold down to a sufficient degree, so that this carrier (5) can extend entirely within the closed path of the conveying belt (2) up to the edge (22) between the front wall (13) and the top wall (21). The bottom edge (15) of the side walls (14) is provided with a recess (17) for accommodating the axle (9) therein. Each side wall (14) is of a hook-shaped design between the support element (16) and the recess (17) in order to hook the side wall (14) over the axle (9).

The rear wall (19) is of a concave design and the support element (16) forms a projection below the rear wall (19), so that an indentation (20) is formed between the rear wall (19) and the support element (16). As a result thereof, the carrier (5) may, in its folded-up position, extend along virtually the entire length of the receiving cavity (6), without the support element (16) or the rear wall (19) getting stuck on the edge of the receiving cavity (6) when the carrier (5) folds down.

At the location of the axle (9), a release element (12) is furthermore provided to engage with the carrier (5) in order to release the carrier (5) from the axle (9). This release element (12) is provided to ensure that the carrier (5) folds up at the correct moment. This prevents the carrier (5) from getting stuck around the axle (9) on the return.

Figure 10:
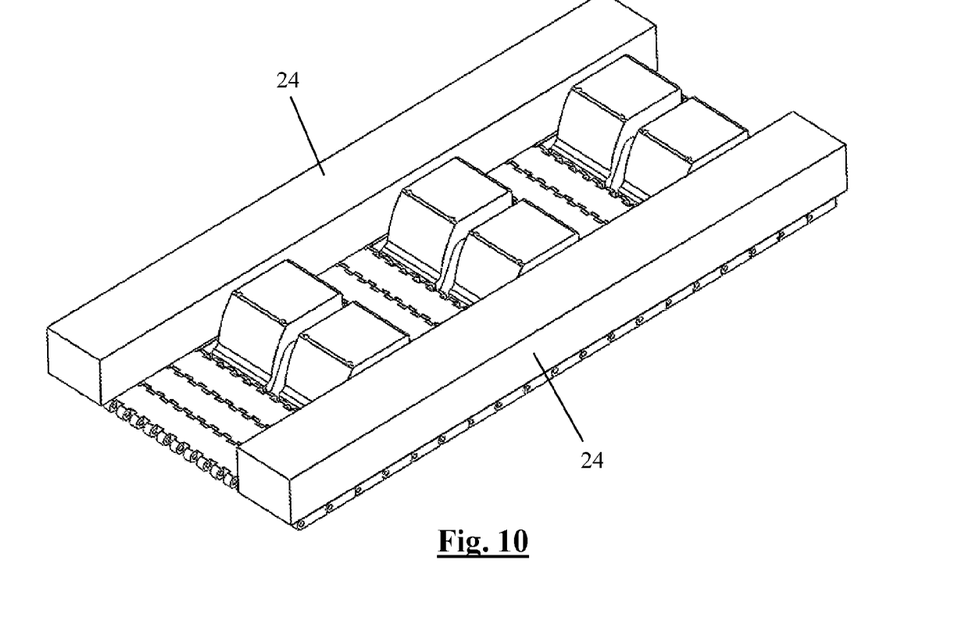
FIG. 10 shows the part of the conveying belt from FIG. 9 provided with side guides.
Figure 11:
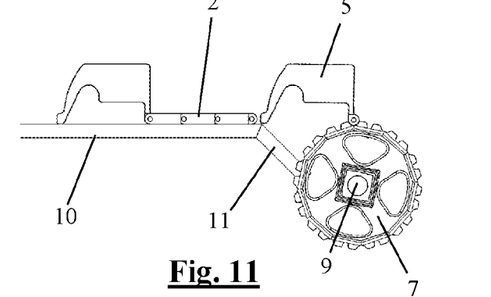
FIGS. 11 to 24 diagrammatically show, in steps and in longitudinal sections, a part of the conveying system from FIG. 2, the pivoting movement of a carrier of this conveying system in order to fold down this carrier from a folded-up position at the location of the discharge point, to guide it by means of the axle of the turning wheels and to fold it back up to beyond the folded-up position.
Figure 12:
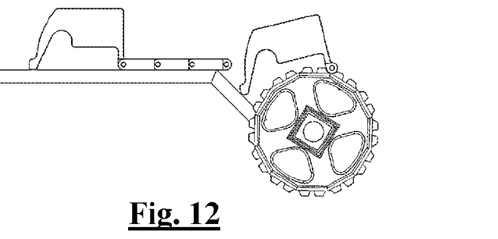
Figure 13:
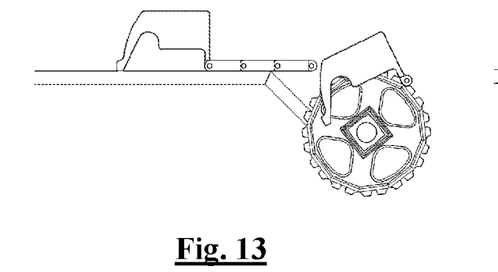
Figure 14:
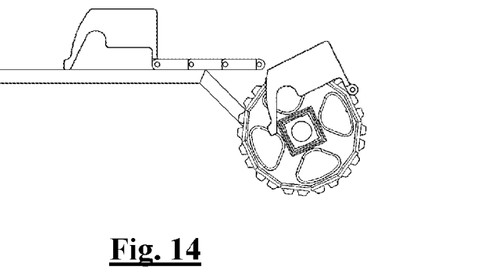
Figure 15:
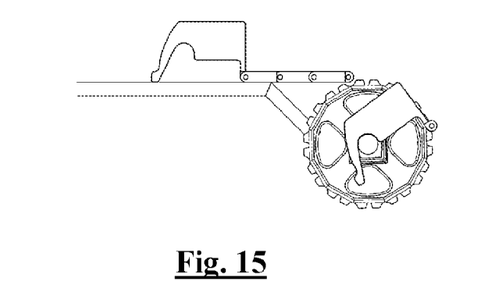
Figure 16:
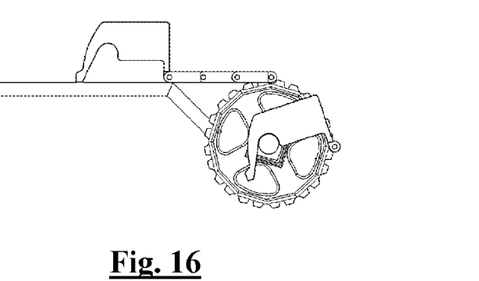
Figure 17:
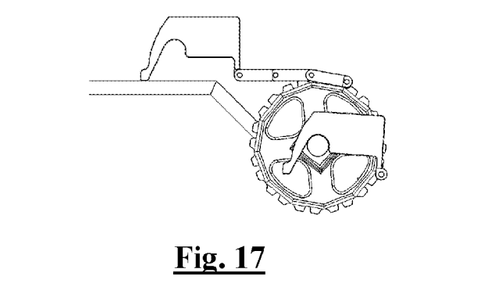
Figure 18:
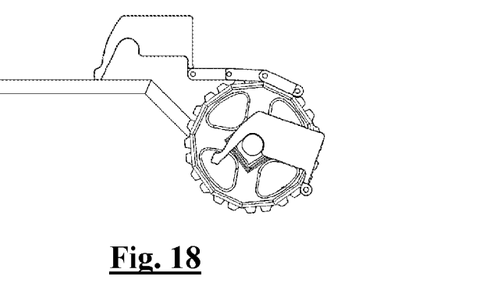
Figure 19:
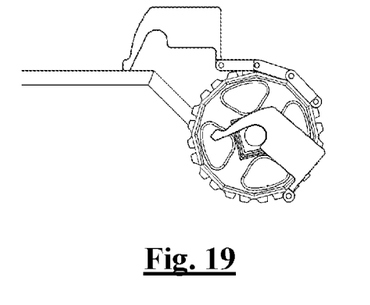
Figure 20:
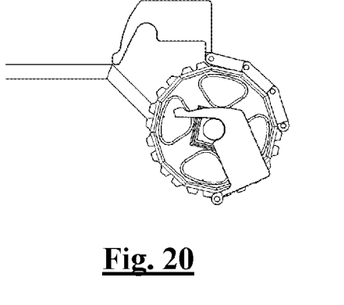
Figure 21:
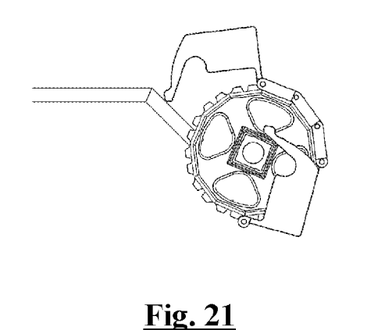
Figure 22:
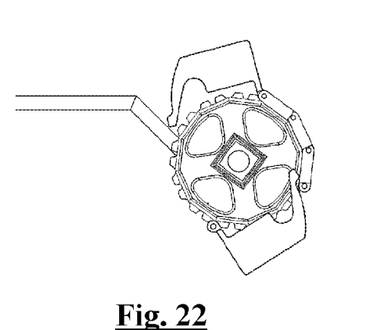
Figure 23:
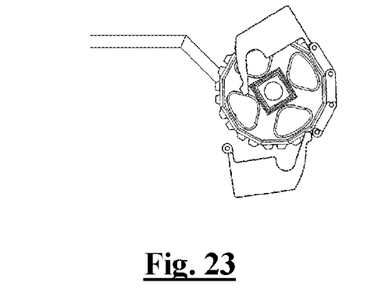
Figure 24:
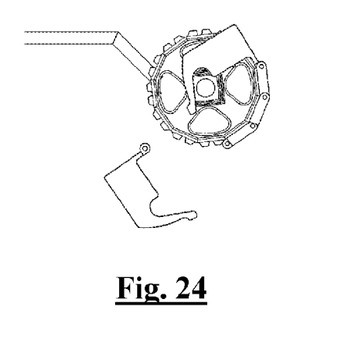
Figure 25:
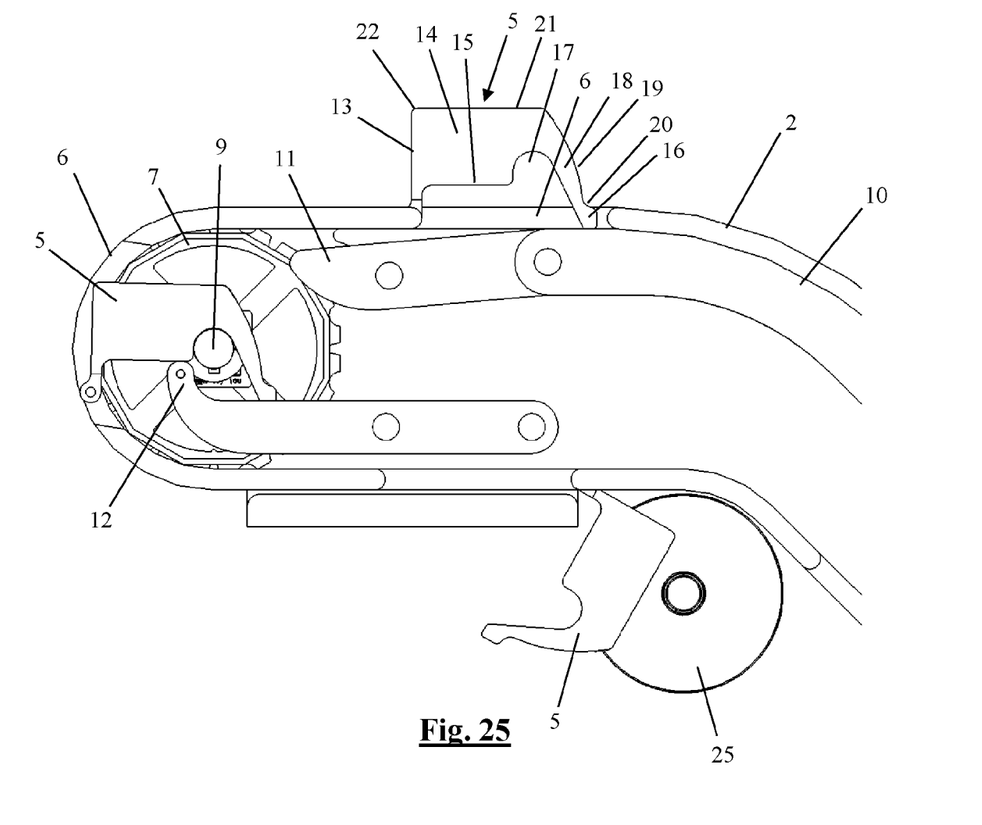
FIG. 25 diagrammatically shows a part of the conveying system from FIG. 2 in longitudinal section at the location of the discharge point.

In order to prevent goods on the conveying path from dropping from the conveying belt (2) sideways, lateral guides (24) are arranged on the lateral sides, as is illustrated in FIG. 10. In this case, these lateral guides (24) extend over the lateral sides of the conveying belt (2) and in this case also largely cover the continuous pieces of the conveying belt on the lateral sides of the receiving cavities (6). As a result thereof, the carriers (5) together extend virtually across the entire width of the conveying belt (2) between these lateral guides (24).

In the illustrated embodiments, in each case two carriers (5) are arranged adjoining each other for each receiving cavity (6) to this end. Alternatively, it is also possible to provide a single carrier which extends across this entire width. In order to produce wider conveying belts (2), it is also possible to provide more than two carriers (5) in the same way adjoining each other for each receiving cavity (6).

The invention claimed is:

1. A conveying system for conveying goods along a conveying direction (A) to a discharge point (X), comprising:
   a conveying belt, comprising conveying modules and pins, which extend transversely to the conveying direction (A), wherein the pins are arranged an intermediate distance (t) apart in order to couple the conveying modules together so as to form the conveying belt;
   turning wheels, around which the conveying belt is drivable along a closed path;
   receiving cavities, in which the conveying belt is free from said conveying modules; and
   carriers, wherein each carrier is hingeably attached to a said pin, which is arranged on a front side of a said receiving cavity, between a folded-down position, in which this carrier is accommodated in this corresponding receiving cavity, and a folded-up position, in which this carrier is upright with respect to the conveying belt in order to entrain the goods when conveying these goods;
   wherein each carrier has a height (h) greater than a said intermediate distance (t), in that each receiving cavity, viewed in the conveying direction (A), is free from conveying modules and from pins along a length (l) greater than a said intermediate distance (t), in that the conveying belt is designed to be continuous adjacent to the lateral sides of the receiving cavities, and in that each carrier extends entirely within the closed path of the conveying belt, between said turning wheels, at the location of the discharge point (X) and in the folded-down position.

2. The conveying system according to claim 1, wherein each carrier comprises a guide element, in that the conveying system comprises a guide system for guiding the guide element in order to drive the pivoting movement of the carrier in such a way that, when driving the conveying belt along the closed path, in a conveying path of the closed path, the carrier remains in its folded-up position in order to convey the goods and the carrier it moved to its folded-down position at the location of the discharge point (X).

3. The conveying system according to claim 2, wherein each carrier comprises a support element to support the carrier in the conveying path by means of the guide system on a support side of the corresponding receiving cavity opposite the front side of the receiving cavity.

4. The conveying system according to claim 2, wherein said turning wheels are arranged so as to be rotatable about an axle at the location of the discharge point (X), between which each carrier extends in the folded-down position at the location of this discharge point (X), and in that this axle forms part of the guide system.

5. The conveying system according to claim 1, wherein each carrier comprises a front wall which is provided in order to be upright in the folded-up position of the carrier with respect to the conveying belt on the front side of the receiving cavity, and one or more additional covering walls to cover the corresponding receiving cavity in the folded-up position of the carrier.

6. The conveying system according to claim 2, wherein each carrier comprises a front wall which is provided in order to be upright in the folded-up position of the carrier with respect to the conveying belt on the front side of the receiving cavity, and one or more additional covering walls to cover the corresponding receiving cavity in the folded-up position of the carrier, and wherein each carrier comprises side walls as covering walls on both its lateral sides, wherein at least one of these side walls is designed as a said guide element.

7. The conveying system according to claim 6, wherein said turning wheels are arranged so as to be rotatable about an axle at the location of the discharge point (X), between which each carrier extends in the folded-down position at the location of this discharge point (X), and in that this axle forms part of the guide system, and wherein the side wall which is designed as a guide element is provided with a recess along its bottom edge for accommodating the axle therein.

8. The conveying system according to claim 7, wherein each carrier comprises a support element to support the carrier in the conveying path by means of the guide system on a support side of the corresponding receiving cavity opposite the front side of the receiving cavity, and wherein the side wall is designed to be hook-shaped between the support element and the recess in order to hook the side wall over the axle.

9. The conveying system according to claim 7, wherein the conveying system comprises a release element which is disposed at the location of the axle to engage with each carrier in order to release the carrier from the axle.

10. The conveying system according to claim 5, wherein each carrier comprises a rear wall which is of a concave design as covering wall on its side opposite the front wall.

11. The conveying system according to claim 3, wherein the conveying system comprises a release element which is disposed at the location of the axle to engage with each carrier in order to release the carrier from the axle, and wherein the support element forms a projection at the bottom of the rear wall.

12. The conveying system according to claim 10, wherein each carrier comprises a top wall as covering wall which connects the front wall and the rear wall.

\* \* \* \* \*